United States Patent [19]

Miyagawa et al.

[11] Patent Number: 4,885,784
[45] Date of Patent: Dec. 5, 1989

[54] SYSTEM FOR BINARY ENCODING A PICTURE

[75] Inventors: Michiaki Miyagawa; Koichi Oki; Hiroyuki Horii, all of Kanagawa, Japan

[73] Assignee: Fuji Electric Company Ltd., Kanagawa, Japan

[21] Appl. No.: 186,698

[22] Filed: Apr. 22, 1988

Related U.S. Application Data

[63] Continuation of Ser. No. 884,074, Jul. 10, 1986, abandoned.

[30] Foreign Application Priority Data

Jul. 10, 1985 [JP] Japan ................................. 60-150024
Jul. 10, 1985 [JP] Japan ................................. 60-150025

[51] Int. Cl.$^4$ .............................................. G06K 9/36
[52] U.S. Cl. ......................................... 382/8; 382/45; 382/50; 358/464
[58] Field of Search .................. 382/8, 44, 45, 50, 53; 358/282

[56] References Cited

U.S. PATENT DOCUMENTS

| | | | |
|---|---|---|---|
| 3,701,099 | 10/1972 | Hall et al. | 382/53 |
| 4,329,717 | 5/1982 | Logie et al. | 358/282 |
| 4,399,554 | 8/1983 | Perkins, III et al. | 382/8 |
| 4,450,579 | 5/1984 | Nakashima et al. | 382/44 |
| 4,475,234 | 10/1984 | Nishijima et al. | 382/48 |
| 4,555,801 | 11/1985 | Miyagawa et al. | 382/45 |
| 4,566,125 | 1/1986 | Clunn | 382/48 |
| 4,677,680 | 6/1987 | Harima et al. | 382/45 |
| 4,679,095 | 7/1987 | Kitamura et al. | 358/282 |

Primary Examiner—Leo H. Boudreau
Attorney, Agent, or Firm—Finnegan, Henderson, Farabow, Garrett & Dunner

[57] ABSTRACT

Methods and apparatus for encoding an image of an object into a binary signal involve the measurement of a preliminary view of the object in order to extract peak optical density information. That peak optical density information is then used to set the thresholds used for comparisons with video signals of the object to encode those video signals as binary signals. The methods and apparatus are also able to detect the offset of the object in the field of view from a standard position and to adjust the images of the objects being measured so that a predetermined "window" of the object is always being viewed.

13 Claims, 8 Drawing Sheets

SYSTEM FOR BINARY ENCODING A PICTURE

This application is a continuation of application Ser. No. 06/884,074, filed July 10, 1986, now abandoned.

BACKGROUND OF THE INVENTION

The present invention relates to the field of picture encoder, and more particularly, to the use of such picture encoders with pattern checking and classifying apparatus.

Figure 1:
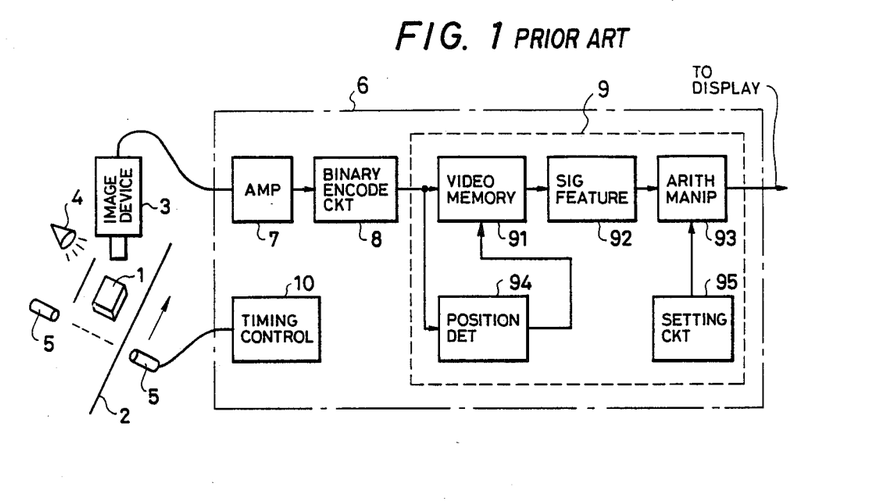
FIG. 1 is a block diagram showing the layout of a conventional apparatus for checking and classifying an object.
Figure 2:
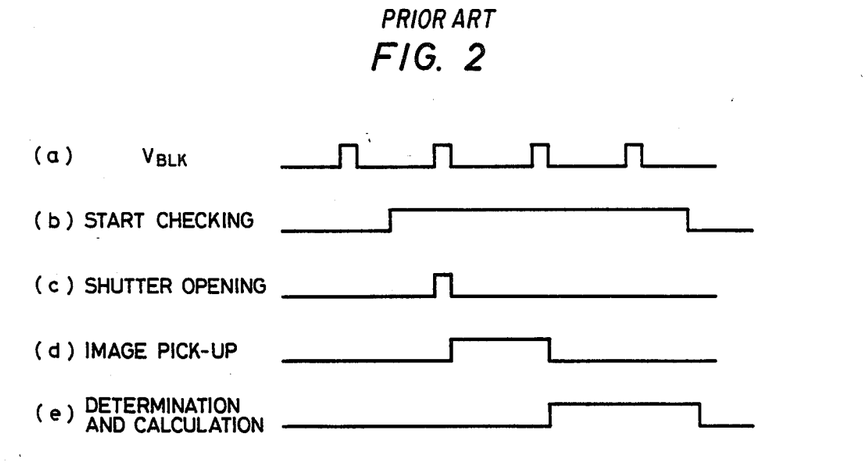
FIG. 2 is a timing chart for explaining the operation of the apparatus in FIG. 1.

FIG. 1 is a block diagram showing the layout of a conventional pattern checking and classifying apparatus, and FIG. 2 is a timing chart which serves to explain the operation of the apparatus in FIG. 1. In FIG. 1, an object 1 on a conveyor belt 2 is examined by an imaging device 3, such as a TV camera. An illuminator 4 illuminates object 1 for examination by imaging device 3. Position sensor 5, which include a light-emitting and light-receiving device in combination, senses the position of object 1 and communicates with a timing control circuit 10.

Timing control circuit 10 is part of a video processing unit 6 which also includes an amplifier 7 connected to imaging device 3, a binary encoding circuit 8 connected to amplifier 7, and a calculating and decision-making section 9 connected to binary encoding circuit 8. The calculating and decision-making section 9 includes a video memory 91, a significant feature extracting circuit 92, an arithmetic manipulation circuit 93, a position detecting and correcting circuit 94, and a setting circuit 95.

In describing the operation of the system in FIG. 1, it is assumed that imaging device is a TV camera with three built-in shutters driven in synchronism with a vertical blanking period signal $V_{BLK}$. The timing for the vertical blanking period is shown in FIG. 2(a). Position sensor 5 detects when object 1, which is transported on conveyor belt 2, reaches a predetermined position in the field of imaging device 3. FIG. 2(b) shows the output of sensor 5, which is a signal for starting the checking operation and which causes the shutter of camera 3 to open in synchronism with $V_{BLK}$. That shutter opening occurs only once as shown in FIG. 2(c).

When the shutter is open, an optical image of object 1 is converted to a picture or video signal by camera 3. The video processing unit 6 then picks up an effective 1 field (1V or one half of a picture or frame) of the camera output as a video signal immediately following the opening of the shutter. The timing and duration of the image pick-up is shown in FIG. 2(d).

Amplifier 7 amplifies the input video signals and binary encoding circuit 8 converts those video signals into a binary video signal. Image memory 91 stores the binary video signal and significant feature extracting circuit 92 extracts from image memory 91 values for the various significant features of object 1. Arithmetic manipulation circuit 93 compares those significant features values with preset values obtained from setting circuit 95 and determines whether the object is acceptable or not. If the object is acceptable, circuit 93 classifies the object into an appropriate group and outputs the results on an appropriate display unit. The timing and duration of this determination and calculation operation is shown in FIG. 2(e). The position detecting and correcting circuit 94 shown in FIG. 1 detects and corrects the amount of positional offset of the object from its reference point.

The preceding discussion assumes that imaging device 3 is a TV camera with a built-in shutter. If device 3 is instead a TV camera without a shutter, a strobe or electronic flash is fired at a time corresponding to the opening of the shutter. Subsequent pattern checking and classification may then be achieved by the same procedures outlined above.

The shutter or the strobe serves to obtain a still image from a continuously moving scene, so a blurless image can be picked up to allow highly precise pattern checking and classification.

The binary encoding circuit 8 in the pattern checking and classifying system of FIG. 1 usually operates with a preset threshold value which is fixed. Such circuitry is simple, allows easy processing, and provides fast access. If, however, the brightness of illuminator 4 varies between images, or if the reflectivities of the objects under examination change from article to article, the video signals received from device 3 will vary. If these varying video signals are encoded by circuit 8 into binary signals by using a fixed threshold level, the image of the object will become heavily distorted. As a result, serious problems may occur and acceptable objects may be rejected as substandard.

A conventional method of examining an object which seeks to address this problem involves converting the video signal for one portion of the image information into a digital quantity. Density information obtained from the image information portion is then stored in a memory and subjected to information processing in order to determine an optimum level. This method, however, involves complicated circuit configurations and requires especially long processing time in order to determine threshold values.

An object of the present invention is to provide a consistent and highly precise binary encoding system which permits fast access, is economical, and is free from false responses caused by changes in illuminator brightness and object reflectivities.

SUMMARY OF THE INVENTION

In accordance with the present invention, two successive video signals are picked up, by an image detector. A binary level determined from the first of the video signals is used to convert the subsequent video signal to a binary signal. With this invention the illumination or reflectance of the objects can vary because the threshold values used for conversion will vary accordingly to reflect the different illumination or reflectivity values. This invention thus enables consistent and highly precise pattern recognition of an object.

The system of the present invention also detects and normalizes the amount of offset caused by a change in position or attitude of an object. This feature of the invention thus enables highly precise binary level determination based on a normalized position or attitude of the object. With the present invention, a moving object is processed to form a blurless picture which can be used to obtain highly precise pattern checking or classification. The binary encoding system of the present invention has the additional advantages of simple and economical system configuration since the invention can be realized without high-speed analog-to-digital conversion circuitry, memory circuitry, or other complicated processing circuitry.

According to the present invention, a binary level is determined using the video information which immediately precedes the desired video information. Conventional systems have considered that preceding video information to be unnecessary and have discarded it. Since, however, that information is available for little extra processing, the processing time of the present invention is not substantially increased over that of conventional systems. Thus, high-speed processing comparable to prior art systems can be ensured. In addition, limiting the density values of a picture in determining the threshold value for binary encoding avoids incorrect operations due to factors such as the handling of unexpected objects.

Additional objects and advantages of the present invention will be set forth in part in the description which follows and in part will be obvious from that description or may be learned by practice of the invention. The objects and advantages of the invention may be realized and obtained by the methods and apparatus particularly pointed out in the appended claims.

To achieve the objects in accordance with the purpose of the invention, as embodied and as broadly described herein, a method of this invention for encoding a video image of an object comprises the steps of forming a preliminary video signal and a desired video signal representing successive video images of the object; analyzing the preliminary video signal in a predetermined window to extract density information; setting a threshold for binary encoding using the extracted density information from the preliminary video information; and comparing the desired video signal with the threshold to form a binary video signal representing the object. An apparatus of this invention includes means for performing similar functions.

In further accordance with the present invention, a method for encoding a video image of an object is provided comprising the steps of forming a preliminary video signal representing a video image of the object; generating from the preliminary video signal positioning coordinates for a predetermined point on the object in a field of view of the imaging device; storing standard coordinates representing a standard position of the predetermined point in the field of view; comparing the positioning coordinates to the standard coordinates to generate offset coordinates representing the difference between the standard coordinates and the positioning coordinates; adjusting the positioning of a predetermined window according to offset coordinates; analyzing the preliminary video signal to extract density information; setting a threshold for binary encoding using the extracted density information from the preliminary video information; forming a desired video signal representing an image of the object formed subsequent to the preliminary video signal; and comparing the desired video signal with the threshold to form a binary video signal representing the object. An apparatus for performing these functions is also provided.

The accompanying drawings, which are incorporated herein and which constitute a part of this specification, illustrate embodiments of the invention and, together with their description, explain the principles of the invention.

DESCRIPTION OF THE PREFERRED EMBODIMENTS

Reference will now be made in detail to presently preferred embodiments of the invention, examples of which are illustrated in the accompanying drawings.

Figure 3:
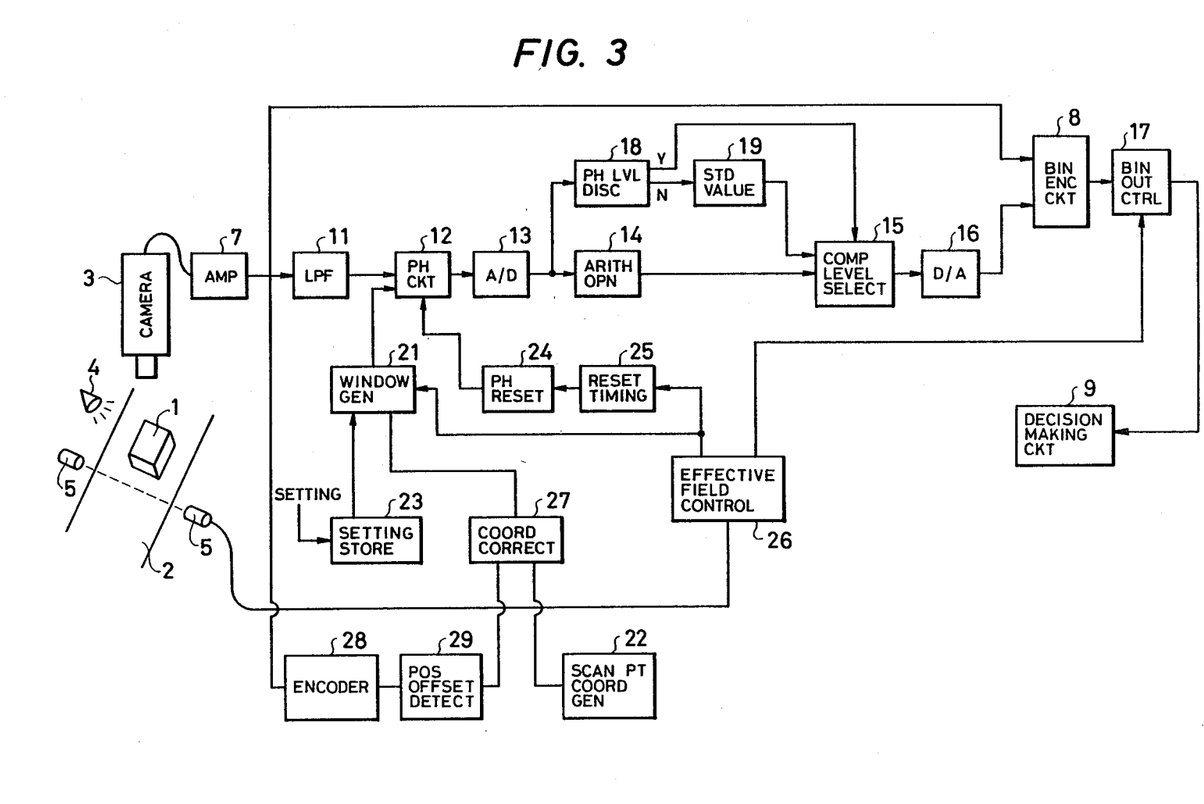
FIG. 3 is a block diagram showing a binary encoding system according to one embodiment of the present invention.

FIG. 3 is a block diagram showing an embodiment of the binary encoding system of the present invention. Elements of FIG. 3 which have the same number as elements in FIG. 1 are equivalent and will not be described again. In FIG. 3, amplifier 7 is connected to a low pass filter (LPF) 11, which is in turn connected to a peak and hold circuit (PH circuit) 12. An analog/digital (A/D) converter circuit 13 is connected both to PH circuit 12 and to an arithmetic operation circuit 14. A comparison level selection circuit 15 is connected to arithmetic operation circuit 14 and to a digital/analog converter (D/A) circuit 16. A PH level discriminator circuit 18 and a standard value outputting circuit 19 are connected between A/D converter circuit 13 and comparison level selection circuit 15. Binary encoding circuit 8 is connected to amplifier 7, to D/A circuit 16 and to a binary output control circuit 17. Binary output control circuit is coupled to decision making circuit 9.

A window generator circuit 21 is connected to a window settings value storing circuit 23 and a coordinate correcting circuit 27. Coordinate correcting circuit 27 is connected both to scanning point coordinate generating circuit 22 and to one end of the series connection of encoder circuit 28 and positional offset detecting circuit 29, the other end of that series connection being connected to amplifier 7.

A PH reset circuit 24 and a reset timing circuit 25 are connected in series between PH circuit 12 and to an effective field control circuit 26. Circuit 26 is also connected to position sensor 5, binary output control circuit 17, and window generator circuit 21.

As in the case of the system shown in FIG. 1, the object 1 is transported on conveyor belt 2 until it enters the field of vision of imaging device or TV camera 3. TV camera 3 is equipped with a shutter which is opened for exposure during each vertical blanking period ($V_{BLK}$) of TV camera 3, so that no incident light is received at other times. TV camera 3 usually performs raster scanning, but other types of imaging are also possible. Illuminator 4 is preferably a tungsten lamp operated by d.c. arcing, but can include other suitable illumination sources as well.

The image of the object which is within the field of vision of the camera will be picked up by the shutter-equipped TV camera 3 for each vertical scanning (i.e., for each V). Needless to say, the video information on the conveyor is treated as being substantially insignificant if no object is being transported on the conveyors. Instead of a shutter, a strobe may be used to produce a still image of the object by flashing the strobe in synchronism with the $V_{BLK}$ signal.

The video signal thus produced from the TV camera is delivered to the analog amplifier 7 in the video processing unit, where the signal is amplified to an appropriate level. The signal from the amplifier 7 is fed into the binary encoding circuit 8 and the low-pass filter (LPF) 11. LPF 11 eliminates from the input video signal noise and weak (high-frequency) video signals of few pixels, and extracts only the video signals having low to medium frequencies. The LPF 11 is provided to avoid any incorrect operation resulting from noise-dependent or object-dependent spurious video signals (for example, caused by halation).

The output of LPF 11 feeds the peak and hold circuit (PH circuit) 12 which holds the peak value of the video signal for a predetermined duration. Window generator circuit 21 and PH reset circuit 24 control the timing of PH circuit 12 to operate only during a window determined by circuit 21, and PH circuit 12 holds and erases the peak values in response to the pulses supplied from a PH reset circuit 24.

The window generator circuit 21 generates a timing "window" corresponding to a predetermined two-dimensional area at a predetermined location within the field of view of camera 3. This window is formed by generating a window signal for each scanning line. The position of the window relative to the object must remain unchanged even if the position of the image of the object is offset within the field of vision of camera 3.

Figure 4A:
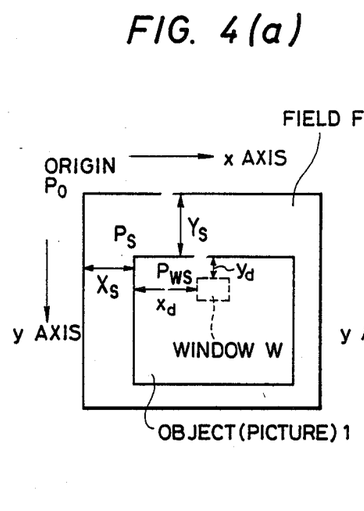
FIGS. 4(a) and 4(b) are illustrations of one method according to the invention for correcting the offset of the position of an object to be checked.
Figure 4B:
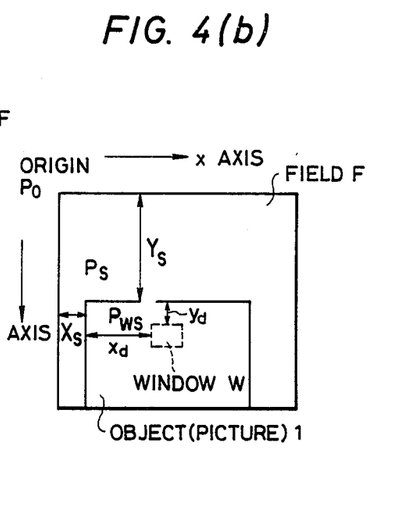

FIG. 4 is an illustration to show a method for correcting the offset of object's position in accordance with the present invention. Scanning point coordinate generator circuit 22 shown in FIG. 3 generates the x- and y-coordinates of the present point of scanning by the TV camera. The y-coordinate of the present scanning point is obtained by counting the number of horizontal scanning lines, while the x-coordinate on the present horizontal scanning line is obtained by counting the number of high frequency (e.g., 6 MHz) reference clock pulses. Circuit 22 thereby outputs a signal for the x- and y-coordinates of the scanning point for each scanning.

From the picture picked up from the TV camera 3 positional offset detector circuit 29 extracts $y_i$, which is the y-coordinate of the advancing edge of the object 1, and $x_i$, which is the x-coordinate of the left edge of the object, in real time and in synchronism with the raster scanning of television. The coordinates $x_s$ and $y_s$ are standard positioning x- and y-coordinates which have been predetermined for the image of a standard object by the same procedure as described above. The two coordinates, $x_i$ and $y_i$, are compared with $x_s$ and $y_s$, and the amounts of positional offsets, $\Delta y$ and $\Delta x$ from the standard position are calculated as follows:

$$\Delta y = y_s - y_i \text{ and}$$
$$\Delta x = x_s - x_i.$$

Correction of positional offset thus involves checking the position of object 1 relative to a predetermined window, and checking the position of the object 1 on the field F corresponding to the field of vision of the camera. These checking steps involve a preliminary determination of the coordinates of the reference point Pws of the window, a determination of the coordinates of the reference point Ps, i.e., $x_s$ and $y_s$, and storage of these coordinates. Then, the coordinates of the reference point Pi of object 1 to be examined (see FIG. 4(b)), $x_i$ and $y_i$, are determined, and the offset in the direction of x-axis ($\Delta x$) and the offset in the direction of y-axis ($\Delta y$) are determined as indicated above by calculating the difference between Ps ($x_s$, $y_s$) and Pi ($x_i$, $y_i$). Then these offsets are then used to correct the coordinates of reference point Pws, so that the window will be generated at the predetermined position of object 1 no matter how that object changes in field F.

The position of the object 1 on the field F ($x_s$, $x_i$, $y_s$, $y_i$) may be determined by first binary encoding the amplified video signal from amplifier 7 in the fixed binary encoder circuit 28 using a fixed threshold level, then by integrating the projections of the resulting binary video signals onto the x- and y-axes.

To implement this procedure using the system in FIG. 3, the coordinates for window generation as preset for a standard object are preliminarily stored in the setting circuit 23. The scanning point coordinate generator circuit 22 outputs a signal for the x- and y-coordinates of the present scanning point while the positional offset detector circuit 29 outputs the positional offsets, $\Delta x$ and $\Delta y$, so that the coordinate correction circuit 27, which performs addition or subtraction as needed on the outputs from the circuits 22 and 29, will output offset-corrected normalized coordinate data.

Window generator circuit 21 generates window information as the logic sum of the output data from the coordinate correction circuit 27 and the data from the setting memory circuit 23. As indicated above, peak and hold circuit (PH) circuit 12 is only operational when this window is "open," and only holds the output from low-pass filter circuit 11 during this window period. Therefore, density information can always be obtained at the predetermined location of the object no matter how it moves within the imaging field of vision.

Figure 5A:
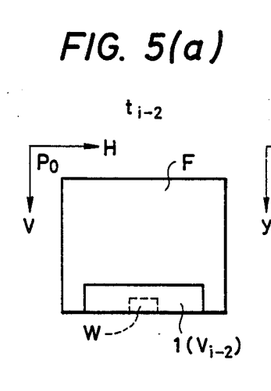
FIGS. 5(a), 5(b) and 5(c) are illustrations of the change which occurs in the position of an object relative to the screen as a result of the movement of the object.
Figure 5B:
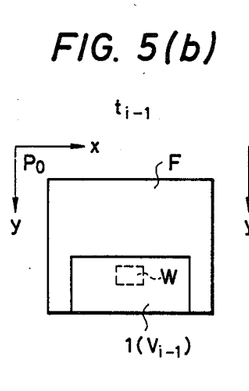
Figure 5C:
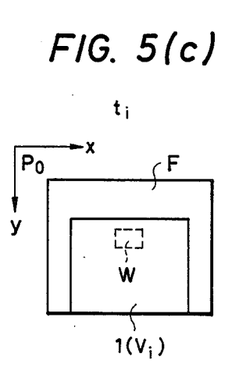
Figure 6:
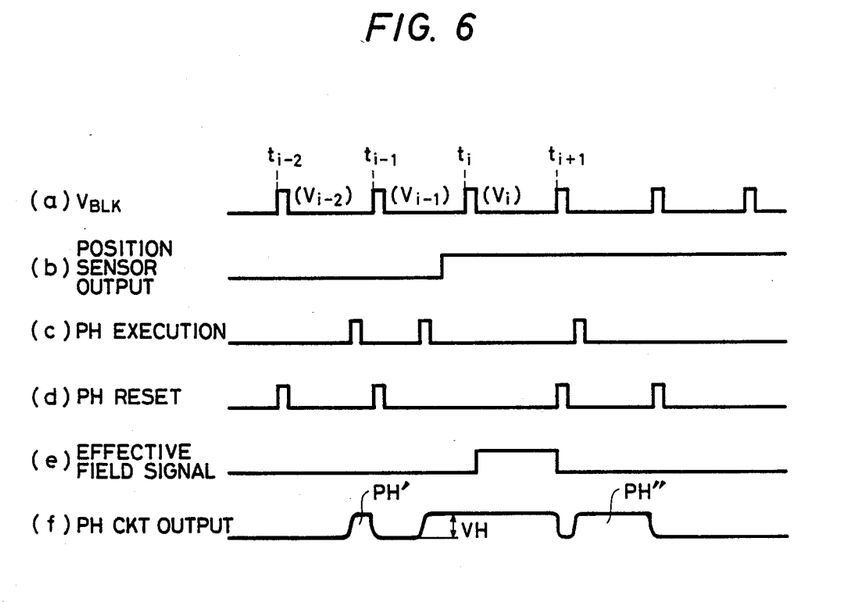
FIG. 6 is a timing chart which is intended for illustrating the operation of the peak and hold circuit shown in FIG. 3.

FIG. 5, which is an illustration of the change in the position of the object relative to the screen as a result of the movement of the object, and FIG. 6, which is a timing chart illustrating the operation of the peak and hold circuit shown in FIG. 3 demonstrate the operation of the window generator circuit 21 and peak and hold circuit 12. The shutter allows exposure for each vertical blanking period, $V_{BLK}$, and allows no incident light to pass during the other periods. For $V_{BLK}$ starting at times $t_{i-2}$, $t_{i-1}$ and $t_i$, the positions of object 1 on the screen may be shown as in FIGS. 5(a), (b) and (c), respectively. In FIGS. 5(a), (b) and (c), W is the window, F is the field of vision (screen) of the TV camera, and $V_{i-2}$, $V_{i-1}$ and $V_i$ represent the images of object 1 at times $t_{i-2}$, $t_{i-1}$ and $t_i$, respectively.

As shown in FIG. 6(a), the output of the position sensor 5 will be obtained immediately before time $t_i$ (FIG. 6(a)). Control circuit 26 produces a binary effective field signal output as shown in FIG. 6(e) in response to the $V_{BLK}$ signal issuing immediately after the production of the output of position sensor 5.

During $V_{BLK}$, the video signal from the TV camera 3 is fed into the PH circuit 12 through the amplifier 7 and the LPF 11. Window generator circuit 21 produces a window signal except during the period when the effective field signal is generated, so circuit 12 will perform its peak and hold operation for each high (H) level period as shown in FIG. 6(c). As a result, the PH circuit 12 will hold the peak value of a low-frequency signal from the TV camera 3 until it receives a reset signal.

As shown in FIG. 6(d), the reset signal for PH reset circuit 24, which resets PH circuit 12, is produced in response to each of the $V_{BLK}$ signals except for the one used to form the effective field signal. As shown in FIG. 6(f), a window is not adequately set at time $t_{i-2}$ and the PH circuit 12 will produce an output as shown by PH′, whereas at time $t_{i-1}$, when the object has reached the position of the window, the PH circuit 12 will produce and hold density information for object 1, as shown by VH in FIG. 6(f). This density information is the peak value of the output from the LPF circuit 11, which corresponds to the output within the area of the window. The value VH is reset by a reset signal outputted at time $t_{i+1}$. If the image of the object is also present at time $t_{i+1}$, its peak value will be held as shown by PH″ in FIG. 6(f).

From the foregoing description, it is apparent that the peak value for a predetermined area can be known on the basis of the video information which is present at a time immediately before the production of the position sensor output ($t_{i-1}$ in the embodiment shown). If an appropriate binary level is determined on the basis of this peak value, the video information which is present at a time immediately after the production of the sensor output ($t_i$ in the embodiment shown) can be binary encoded for the determined binary level. By performed pattern checking and classification on the basis of this binary picture, the processing time for binary encoding is shortened while the precision of pattern checking or classification is improved.

To determine a binary level from the peak value of the video information immediately before the production of the sensor output, a standard object is first imaged at a standard position and the threshold value for binary encoding is adjusted such that an appropriate binary picture is obtained. An appropriate value for binary encoding, $L_s$, and the corresponding peak and hold value for PH circuit 12, $V_{HS}$, are determined and stored in the arithmetic operation circuit 14 as references. The detection of standard object's position relative to the window is also performed at this point of time.

Next, the same procedures are repeated for object 1 to be examined to determine a peak and hold value, $V_{HX}$, representing density information for the picture $V_{i-1}$ present within the area of window immediately before decision making.

From the correlation between the two peak and hold values, the candidate for the threshold value for the binary encoding of the object being examined, $L_X$, may be safely regarded as being equal to $V_{HX}/V_{HS} \times L_s$. Arithmetic operation circuit 14 uses this formula to determine the appropriate threshold value for binary encoding.

PH level discriminator circuit 18 also checks the peak and hold value $V_{HX}$ for its validity to examine whether that value is within a certain range, for example, 0.5 to 1.5 $V_{HS}$. If $V_{HX}$ is within the above-specified range (as indicated by the path Y in FIG. 3), comparison level selection circuit 15 will select the output of the arithmetic operation circuit 14 ($L_X$), which is passed through the D/A converter circuit 16 to be fed into the binary encoder circuit 8 as its threshold value. If $V_{HX}$ is outside the specified range (as indicated by the path N in FIG. 3), comparison level selection circuit 15 selects the output from the standard value outputting circuit 19, which usually outputs a standard value. The reasons for the selection of threshold values from circuits 14 and 19 is that it is risky to use the resultant abnormal calculated threshold value for binary encoding, if $V_{HX}$ is abnormal, and it is safer to use the standard value $V_{HS}$.

This binary level signal from comparison level selection circuit 15 is passed through the D/A converter circuit 16 and fed to one input of the binary encoder circuit 8. The other input of the circuit 8 is the amplified video signal from amplifier 7 present at time $t_i$. That amplified video signal is converted to a binary video signal by means of the binary level signal from the D/A converter circuit 16. The effective field control circuit 26 simultaneously produces the effective field signal and feeds it to the binary output control circuit 17 which then ensures that only the binary video signal from the circuit 8 which is effective for the purpose of pattern checking and classification may be outputted. That binary video signal is fed into the calculating and decision making circuit 9 which executes predetermined steps of video processing for achieving pattern checking and classification of the object.

The description of the embodiment of the invention in FIG. 3 assumes that positional correction is directed to parallel offsets of x- and y-axes, but it should be understood that offsets in rotation (attitude) can also be corrected by the same procedures using a circuit for detecting the amount of rotation and a circuit for transforming the coordinates by rotation. The preceding description also assumes that one window is set for a single channelled binary encoding circuit, but to accommodate highlights and shadows of an object under examination, the binary encoder circuit may be multi-channelled to provide multiple windows, which are then checked for their correspondence to enable selective control of the threshold values for binary encoding. It may also be possible to set multiple windows for one binary encoding circuit.

In the embodiment shown in FIG. 3 and described above, the peak value of the video signal for the picture within the window is used as a basis for determination of an appropriate binary level. If desired, the average value of the density information may also be used for the same purpose. In addition, the shape of the window is not limited to a rectangle, but it may instead assume any other appropriate geometrical form.

Figure 7:
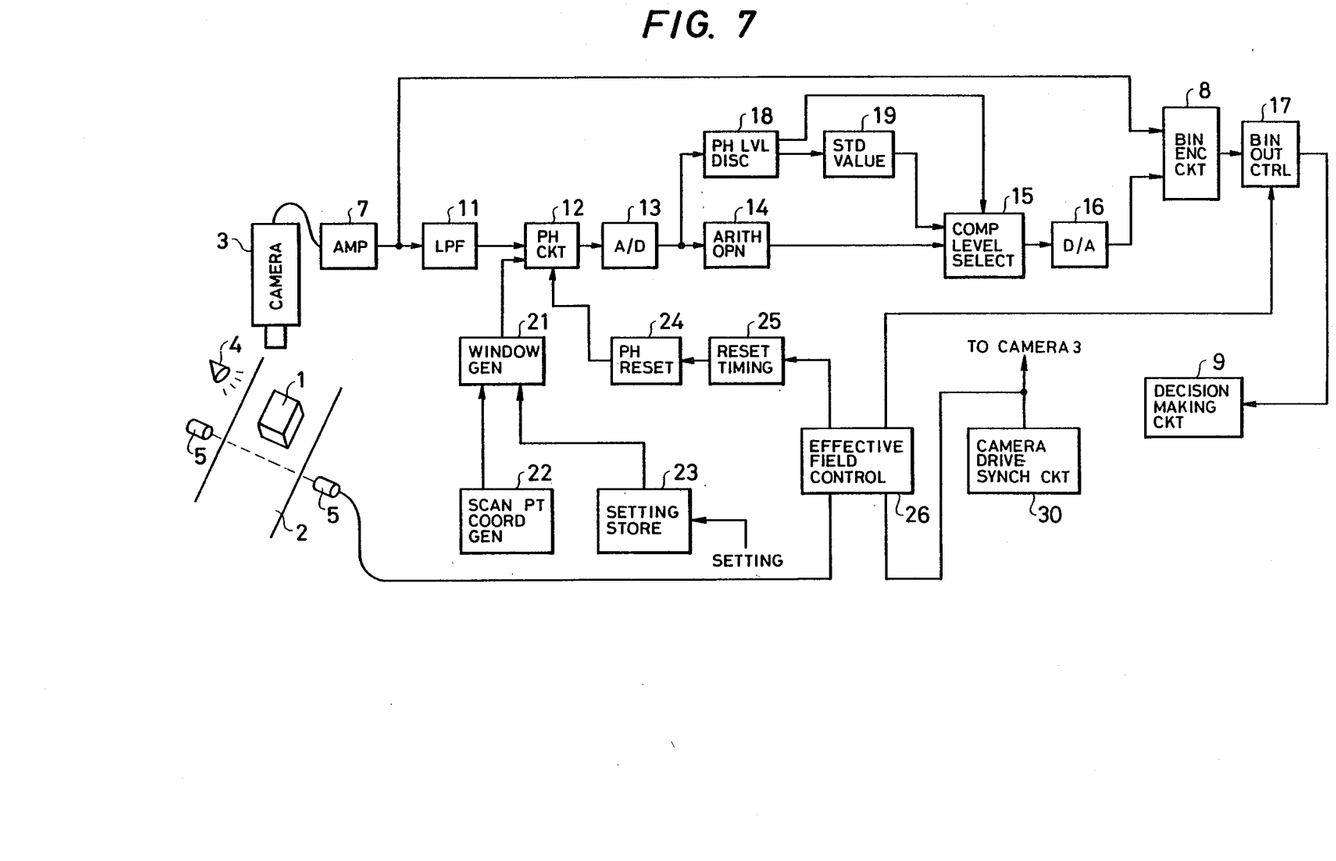
FIG. 7 is a block diagram showing a binary encoding system according to another embodiment of the present invention.

A second embodiment of the binary encoding system of the present invention is shown in FIG. 7, wherein the components which are identical to those used in the first embodiment shown in FIG. 3 are identified by like numerals. Although TV camera 3 in FIGS. 3 and 7 are identified by like numerals, the camera 3 used in FIG. 7 may have the configuration shown in FIG. 8(a) and include an imaging device 31, a video processing and imaging device drive circuit 32, a lens system 33, a rotating disk 34, a motor 35, a rotation control circuit 36 and a casing 37. The disk 34 has a plurality of slits formed at predetermined positions on the periphery. Disk 34 is disposed between the lens system 33 and the imaging device 31 and is rotated with the motor 35 to function as a "focal-plane shutter." The rotation control circuit 36 controls the rotation of the motor such that exposure by the rotating disk 34 will keep in step with the vertical blanking period ($V_{BLK}$) of the TV camera.

Figure 8A:
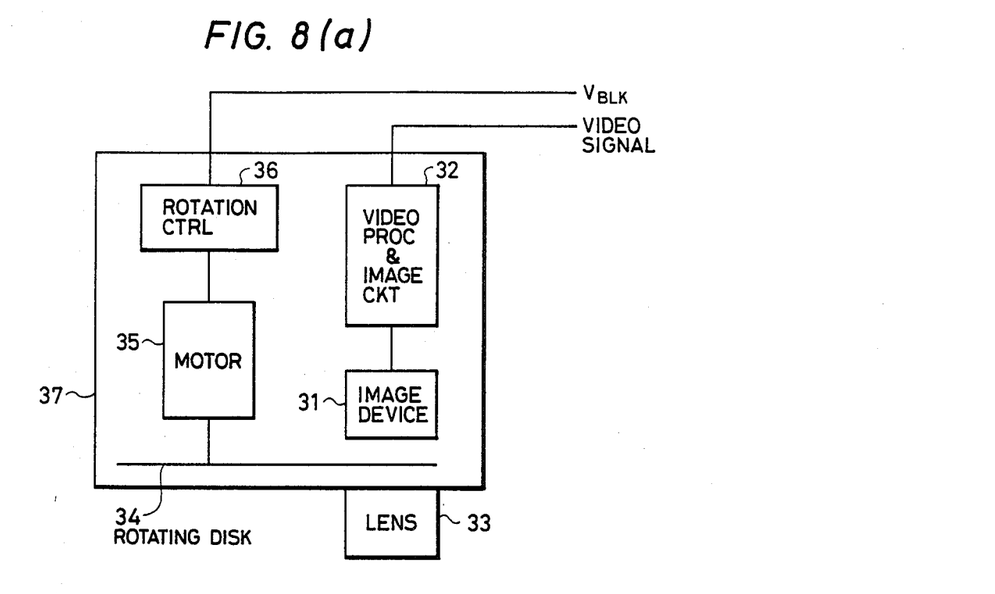
FIG. 8(a) is a block diagram showing an example of a TV camera with a built-in shutter.
Figure 8B:
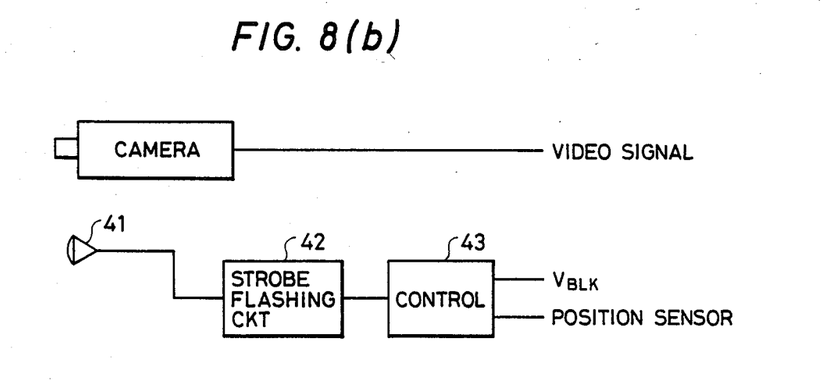
FIG. 8(b) is a diagrammatic representation of a TV camera used in combination with a strobe.

The shutter device shown in FIG. 8(a) may alternatively include a strobe or electronic flash as shown in FIG. 8(b). The system in FIG. 8(b) includes a strobe 41, a strobe flashing circuit 42, and a strobe flashing control circuit 43. The control circuit 43 is fed with a $V_{BLK}$ signal and an output from the position sensor and the signal $V_{BLK}$ issuing after the production of the position sensor output is fed to the flashing circuit 42 which then flashes the strobe 41.

Therefore, a plurality of video signals may be obtained by employing either a TV camera with a built-in shutter or a combination of a TV camera and a strobe. In the former case, the TV camera having the construction shown in FIG. 8(a) is combined with the illuminator 4 shown in FIG. 7, and in the latter case, the configuration shown in FIG. 8(b) may be used.

The binary encoding system of the present invention according to its second embodiment is described only with respect to the features that differ from the embodiment shown in FIG. 3. In the systems of FIG. 7, the scanning point coordinate generator circuit 22 determines the y-coordinate of the present scanning point by counting the number of horizontal scanning lines from the TV camera 3, and circuit 22 and determines the x-coordinate on the present horizontal scanning line by counting the number of high-frequency (e.g., 6 MHz) reference clock pulses. As a result, the circuit 22 outputs a signal for the x- and y-coordinates of the present scanning point for each scanning. Therefore, if the information for the area of window is preliminarily set and stored in the setting memory circuit 23, a predetermined area of window can be set by means of the window generator circuit 21 which determines whether the information from the memory circuit 23 coincides with the positional information for the x- and y-coordinates from the scanning point coordinate generator circuit 22.

Figure 9A:
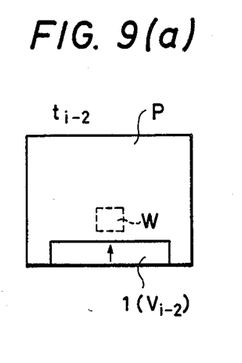
FIGS. 9(a), 9(b) and 9(c) are illustrations of the change which occurs in the position of an object relative to the screen as a result of the movement of the object.
Figure 9B:
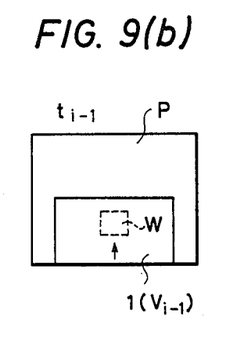
Figure 9C:
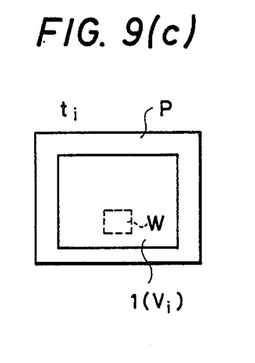
Figure 10:
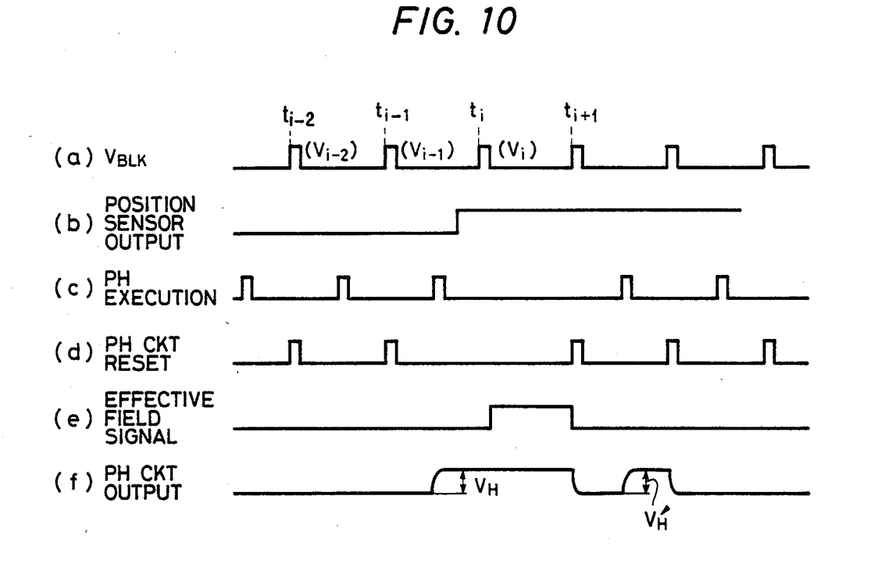
FIG. 10 is a timing chart intended for illustrating the peak and hold circuit shown in FIG. 7.

FIG. 9 is an illustration of the change which occurs in the position of the object relative to the screen as a result of the movement of the object and FIG. 10 is a timing chart for illustrating the operation of the peak and hold circuit shown in FIG. 7.

The shutter performs exposure for each vertical blanking period, $V_{BLK}$, with no incident light being permitted to pass during the other periods. For the blanking periods $V_{BLK}$ starting at times $t_{i-2}$, $t_{i-1}$ and $t_i$, the position of the object relative to the window is as shown in FIGS. 9(a), (b) and (c) for those respective points of time. For object 1, W is the window, and P is the field of vision (screen) of the TV camera, with $V_{i-2}$, $V_{i-1}$ and $V_i$, representing the images of the object at times $t_{i-2}$, $t_{i-1}$ and $t_i$, respectively, as shown in FIG. 10(a). The output of the position sensor will be obtained immediately before time $t_i$ as shown in FIG. 10(b).

The control circuit 26 produces a binary effective field signal output as shown in FIG. 10(e) in response to the $V_{BLK}$ signal issuing immediately after the production of the position sensor output. The video signal from the TV camera 3 is fed into the PH circuit 12 through the amplifier 7 and LPF 11. If the window generator 21 is designed so that it will produce a window signal in all periods except when the effective field signal is generated, the peak and hold operation will be performed for each high (H) level period as shown in FIG. 10(c). As a result, the PH circuit 12 will hold the peak value of a low-frequency signal from the TV camera 3 until it receives a reset signal.

As shown in FIG. 10(d), the reset signal for PH circuit is produced in response to each of the $V_{BLK}$ signals except for the one used to form the effective field signal, and the produced reset signal resets the PH circuit 12. As shown in FIGS. 9 and 10, object 1 has yet to reach the position of the window at time $t_{i-2}$, so that the output of the PH circuit 12 is substantially zero. In contrast, at time $t_{i-1}$ when the object has reached the position of the window, the PH circuit 12 will produce density information for the object which is held as shown by $V_H$ in FIG. 10(f). This density information is represented by the peak value of the output within the area of window. The value $V_H$ is reset by a reset signal outputted at time $t_{i+1}$. If the image of the object is also present at time $t_{i+1}$, its peak value will be held as shown by VH' in FIG. 10(f).

From the foregoing description, it can be seen that the peak value for a predetermined area can be known on the basis of video information which is present at time immediately before the production of the position sensor output ($t_{i-1}$ in the embodiment shown). If an appropriate binary level is determined on the basis of this peak value, the video information which is present at a time immediately after the production of the sensor output ($t_i$) in the embodiment shown can be binary encoded for the determined binary level. By performing pattern checking and classification on the basis of this preceding binary picture, the processing time for binary encoding is shortened while the precision of pattern checking or classification is improved.

A binary level may be determined from the peak value so obtained by a technique which is essentially the same as described in connection with the embodiment of FIG. 3.

Figure 11:
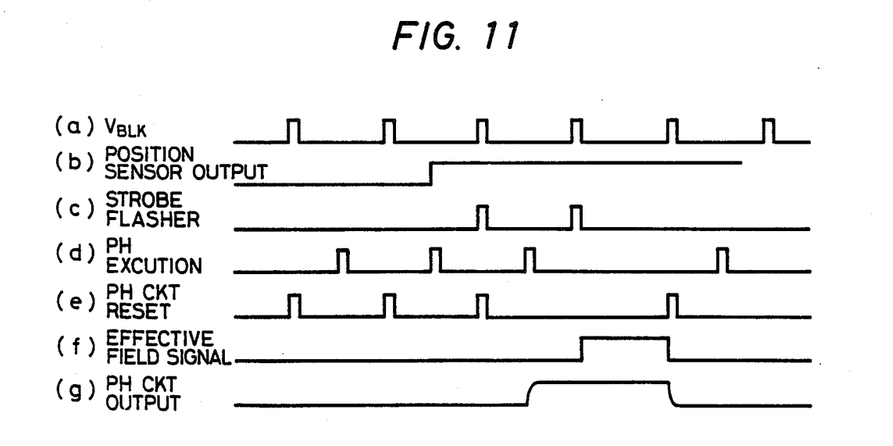
FIG. 11 is a timing chart to explain the peak and hold operation performed when a TV camera is used in combination with a strobe.

The aforementioned technique for determining the binary level assumes the use of a shutter-equipped TV camera but the same technique may also be applied where a combination of a strobe with a TV camera is used. FIG. 11 is a timing chart illustrating the peak and hold operation for a strobe. FIG. 11 is essentially identical to FIG. 10 except for two minor differences. First, the strobe is flashed at the timing shown by the labeled line in FIG. 11. Second, the operation of each of the components is offset by one field behind the output of the position sensor. It should however be noted that the offset of one field on a time basis is of a constant value and, hence, that the position of the setting of the position sensor must be offset by a corresponding amount.

Figure 12:
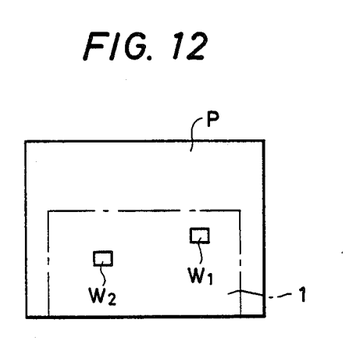
FIG. 12 is an illustration of how the present invention can work when two windows are provided for each object.

FIG. 12 shows the case where two windows are provided for the picture of the object as indicated by $W_1$ and $W_2$.

What is claimed is:

1. A method for encoding a video image of a plurality of objects comprising the steps of:
   transporting said objects past a video imaging device;
   locating a predetermined window at the same relative position of each of said objects, forming a preliminary video signal from said predetermined window of said video image of each said object using said video imaging device;

forming a desired video signal for each of said objects using said video imaging device from a complete video image of each said object;

analyzing said preliminary video signal to extract density information;

setting, for each of said objects, a threshold for binary encoding using said extracted density information from said preliminary video information; and comparing said desired video signal for each of said objects with said threshold for that object to form a binary video signal representing that object.

2. The method of claim 1 wherein said step of setting said threshold includes the steps of:

comparing said extracted density information with a standard density value range;

setting said threshold to said extracted density information if said extracted density information is within said standard density range; and setting said threshold to a standard density value if said extracted density information is not within said standard density range.

3. The method according to claim 2 further including the step of forming a video signal from a standard object to determine said standard density range.

4. The method of claim 1 wherein said step of forming said preliminary and desired video signals includes the steps of viewing each said object with said imaging device having a known field of view to form said video signals; and forming said preliminary video signal from said predetermined window in said field of view of said imaging device.

5. The method of claim 1 further including the steps of sensing the movement of each said object past a stationary imaging device used for forming said video signals; and forming said desired video signal after the sensing of said movement past said stationary imaging device.

6. The method of claim 1 further including the step of processing said binary video signal to extract desired features.

7. A method of encoding a video image of a plurality of objects comprising the steps of:

transporting said objects past a video imaging device;

locating a predetermined window at the same relative position of each of said objects;

forming a preliminary video signal for each of said objects from a portion of said video image of that object obtained from said video imaging device at said predetermined window;

generating, from said preliminary video signal, positioning coordinates for a predetermined point on each said object in a field of view of said imaging device;

storing standard coordinates representing a standard position of said predetermined point in said field of view;

comparing said positioning coordinates to said standard coordinates to generate offset coordinates representing the difference between said standard coordinates and said positioning coordinates; and adjusting succeeding video images in said predetermined window for each said object by said offset coordinates to normalize the positioning of said window in said field of view.

8. The method of claim 7 further including the step of analyzing a window of said succeeding video images in said field of view; and wherein said adjusting step includes the step of adjusting the coordinates of said window in said field of view according to said offset coordinates.

9. A method for encoding a video image of a plurality of objects comprising the steps of:

transporting said objects past a video imaging device;

locating a predetermined window at the same relative position of each of said objects;

forming a preliminary video signal representing a portion of a video image of each of said objects obtained from said video imaging device using said predetermined window;

generating from said preliminary video signal positioning coordinates for a predetermined point on each said object in a field of view of said imaging device;

storing standard coordinates representing a standard position of said predetermined point in said field of view;

comparing said positioning coordinates to said standard coordinates to generate offset coordinates representing the difference between said standard coordinates and said positioning coordinates;

analyzing said preliminary video signal in said predetermined window representing said image portion, said window being adjusted according to said offset coordinates to extract density information;

setting, for each of said objects, a threshold for binary encoding using said extracted density information from said preliminary video information;

forming a desired video signal for each of said objects representing a complete image of each said object subsequent to forming said preliminary video signal; and comparing said desired video signal for each of said objects with said threshold for that object to form a binary video signal representing that object.

10. The method of claim 9 wherein the step of forming said desired video signal includes the step of forming said desired video signal in a window of said field of view; and wherein said desired video signal forming step includes the step of adjusting the coordinates of said window in said field of view according to said offset coordinates.

11. An apparatus for encoding a video image of a plurality of objects comprising:

means for forming, for each of said objects, a preliminary video signal from a predetermined window of an image of that object and for forming a desired video signal representing successive complete video images of that object;

means for transporting said objects past said video signal forming means;

means for aligning, for each of said objects, said predetermined window at the same relative position of each of said objects;

peak holding means, coupled to said video signal forming means, for analyzing said preliminary video signal to extract peak density information;

threshold means, coupled to said peak holding means, for setting a threshold for each of said objects from said extracted density information; and binary encoding means, coupled to said video signal forming means and to said threshold means, for comparing said desired video signal with said threshold for each said object to form a binary video signal representing that object.

12. An apparatus for encoding a video image of a plurality of objects comprising;

imaging means for forming a preliminary video signal from a predetermined window of the video image of each said object and for forming a desired video signal for that object from said video image of that object in a field of view of said imaging means;

means for transporting said objects past said imaging means;

locating means, coupled to said imaging means, for generating from said preliminary video signal positioning coordinates for a predetermined point on each said object in said field of view of said imaging device;

memory means for storing standard coordinates representing a standard position of each said predetermined point in said field of view;

offset coordinate generating means, coupled to said memory means and to said locating means, for comparing said positioning coordinates to said standard coordinates to generate offset coordinated representing the difference between said standard coordinates and said positioning coordinates for each of said objects;

repositioning means, coupled to said offset coordinate generating means, for using said offset coordinates to normalize the positioning of each said predetermined window at the same relative position for each of said objects;

peak holding means, coupled to said imaging means, for analyzing said preliminary video signal in each said window to extract peak density information; and threshold means, coupled to said imaging means and said peak holding means, for setting a threshold for each said object from said extracted density information.

13. An apparatus for encoding a video image of a plurality of objects comprising:

imaging means for forming a preliminary video signal from a portion of the video image of each said object in a field of view of said imaging means;

means for transporting each of said objects past said imaging means;

locating means, coupled to said imaging means, for generating, from said preliminary video signal, positioning coordinates for a predetermined point on each said object in said field of view of said imaging device;

memory means for storing standard coordinates representing a standard position of each said predetermined point in said field of view;

offset coordinate generating means, coupled to said memory means and to said locating means, for comparing said positioning coordinates to said standard coordinates to generate offset coordinates representing the difference between said standard coordinates and said positioning coordinates for each of said objects; and repositioning means, coupled to said offset coordinating means, for adjusting said imaging means by said offset coordinates to normalize the positioning of a predetermined window in said field of view corresponding to said video image portion such that said predetermined window is at the same relative position for each of said objects.

* * * * *